(12) United States Patent
Todd et al.

(10) Patent No.: US 9,460,136 B1
(45) Date of Patent: Oct. 4, 2016

(54) MANAGING DATABASES IN DATA STORAGE SYSTEMS

(75) Inventors: Stephen J. Todd, Shrewsbury, MA (US); Michel F. Fisher, Natick, MA (US)

(73) Assignee: EMC Corporation, Hopkinton, MA (US)

(*) Notice: Subject to any disclaimer, the term of this patent is extended or adjusted under 35 U.S.C. 154(b) by 0 days.

(21) Appl. No.: 13/173,455

(22) Filed: Jun. 30, 2011

(51) Int. Cl.
*G06F 17/30* (2006.01)
*G06F 11/34* (2006.01)

(52) U.S. Cl.
CPC ..... *G06F 17/30339* (2013.01); *G06F 11/3442* (2013.01)

(58) Field of Classification Search
CPC .............. G06F 17/30306; G06F 17/30339; G06F 11/3452; G06F 11/3409; G06F 11/3433; G06F 9/5083; G06F 11/3442; H04L 67/1029
USPC ................................ 707/693, 827, 964, 966
See application file for complete search history.

(56) References Cited

U.S. PATENT DOCUMENTS

| | | | | |
|---|---|---|---|---|
| 6,122,640 | A * | 9/2000 | Pereira | 707/648 |
| 7,228,566 | B2 * | 6/2007 | Caceres et al. | 726/25 |
| 2004/0025162 | A1 * | 2/2004 | Fisk | G06F 3/0613 718/105 |
| 2004/0054850 | A1 * | 3/2004 | Fisk | H04L 41/08 711/112 |
| 2004/0073639 | A1 * | 4/2004 | Basoglu et al. | 709/223 |
| 2004/0078398 | A1 * | 4/2004 | Chiang et al. | 707/204 |
| 2004/0117387 | A1 * | 6/2004 | Civetta et al. | 707/100 |
| 2004/0230763 | A1 * | 11/2004 | Cohen et al. | 711/170 |
| 2005/0120273 | A1 * | 6/2005 | Hudson et al. | 714/38 |
| 2007/0282878 | A1 * | 12/2007 | Marshall | 707/101 |
| 2008/0189303 | A1 * | 8/2008 | Bush et al. | 707/100 |
| 2009/0049110 | A1 * | 2/2009 | Plow et al. | 707/206 |
| 2010/0278446 | A1 * | 11/2010 | Ganesh et al. | 382/243 |
| 2011/0314071 | A1 * | 12/2011 | Johnson et al. | 707/827 |
| 2012/0054248 | A1 * | 3/2012 | Mehrotra et al. | 707/803 |
| 2012/0303629 | A1 * | 11/2012 | Klein et al. | 707/741 |

OTHER PUBLICATIONS

Hoffer et al. Modern Database Management. 2004. Prentice Hall. 7th Edition. pp. 251-252.*

* cited by examiner

*Primary Examiner* — James E Richardson
(74) *Attorney, Agent, or Firm* — Krishnendu Gupta; Jason A. Reyes (57) ABSTRACT

There is disclosed a method for use in managing databases in data storage systems comprising a plurality of nodes. A request is received to provision storage for a specified application intending to use a database. Based on application-awareness, the storage system is provisioned for storing the database in response to receiving the request. Database tables are distributed across the nodes based on a forecasted first I/O profile between application and database. Information is captured in connection with the activity between the application and database. A second I/O profile is determined based on the captured information. The second I/O profile is an actual in-running I/O profile between application and database. The first I/O profile and second I/O profile are compared. The database tables are re-organized on the nodes based on the comparison identifying a discrepancy between first and second I/O profiles such that storage system is rebalanced.

10 Claims, 8 Drawing Sheets

MANAGING DATABASES IN DATA STORAGE SYSTEMS

FIELD OF THE INVENTION

The present invention relates to managing databases in data storage systems.

DESCRIPTION OF THE PRIOR ART

It is well known that a client/server distributed system provides a centralized data storage and a database management system (hereinafter "DBMS") for managing information in response to data queries and update transactions. As used herein, the terms "data query" or "query" mean read-only requests for data and the terms "update transaction" or "transaction" mean any read-write operations involving changes to the data stored in the database. The client systems may be connected to a network which is connected to a host or application server. The client systems have client software for interfacing with server software on the application server. The client software could be any software application or module providing a user interface for issuing data queries or update transactions such as DBMS-specific client application or more generally a Web browser application. Similarly, the server software could be a software application provided specifically for processing a user database request or could be an application capable of providing more generalized services such as a web server.

The application server is connected to a DBMS server which has a data store. The DBMS server has DBMS software for managing data in the data store. DBMS software is available from many vendors, for example, Oracle Corp. of Redmond Shores, Calif., Sybase Inc. of Dublin, Calif., and International Business Machines Corp. of Armonk, N.Y., among others. As known in the art, the application server and the DMBS server could be the same computer system or different computer systems. Moreover, the application server and the DBMS server could be in the same facility, or they could be located in physically separated facilities.

However, as a person skilled in the art will realize the above system can suffer from fragmentation after a certain period of time. Moreover, the system may become unbalanced when data is distributed across many nodes at ingest and subsequently the application sends down a different I/O profile than was expected.

The issue of fragmentation arises when storage space is used inefficiently resulting in reduced storage, capacity and performance. For example, a file in a file system is usually managed in block units. When a file system is created there is free space to store file blocks together contiguously. This allows for rapid sequential file reads and writes. However, as files are added, removed, and changed in size, the free space becomes fragmented, leaving only small holes in which to place new data. When a new file is written, or when an existing file is extended, the new data is put in new non-contiguous data blocks to fit into the available holes. The new data blocks are scattered, slowing access due to seek time and rotational delay of the read/write head.

It will be appreciated by those skilled in the art if fragmentation is low the disk head movement involved in executing a query can be minimal. This is because the disk head tends to move in one direction as the number of head movements back and forth over gaps of data not needed in the query is minimal. Accordingly, where fragmentation is low disk I/Os can be completed quickly. However, when fragmentation is high, the disk head tends to move frequently back and forth over gaps in the process of locating data needed for the query. As a result when fragmentation is high disk I/Os complete more slowly.

A storage system can also become unbalanced when data is distributed across many nodes and the data on one node is busier than the data on another node. The issue is often more pronounced when there is a plurality of nodes and database tables are distributed across the respective nodes. In this case the activity can vary greatly in connection with the respective nodes. This can affect system performance.

SUMMARY OF THE INVENTION

A method and system is used in managing databases in data storage systems comprising a plurality of nodes for facilitating receiving, storing, accessing and processing data. In one embodiment, an application is identified intending to use a database. Based on identifying the application, the data storage system is provisioned for storing the database. The distribution of database tables is allowed across the plurality of nodes. A first I/O profile is estimated, wherein the first I/O profile is a forecasted I/O profile between the application and the database. Information is captured in connection with the activity between the application and the database. Based on the captured information, a second I/O profile is determined, wherein the second I/O profile is an actual in-running I/O profile between the application and the database. The first I/O profile and the second I/O profile are compared and based on the comparison identifying a discrepancy between the first and second I/O profiles, the database tables on the respective nodes are reorganized.

In another embodiment, an application is identified intending to use a database. Based on identifying the application, the data storage system is provisioned for storing the database. The distribution of database tables is allowed across the plurality of nodes. Fragmentation is detected in connection with the database tables on the respective nodes. Based on detecting fragmentation, the database tables on the respective nodes are reorganized.

BRIEF DESCRIPTION OF THE DRAWINGS

The invention will be more clearly understood from the following description of preferred embodiments thereof which are given by way of example only with reference to the accompanying drawings in which.

DETAILED DESCRIPTION

There is described below a method or technique for use in managing databases in data storage systems. At least one implementation using the technique involves application-aware provisioning and monitoring of a massively parallel database to allow intelligent management software to automatically rebalance contiguous chunks of a database after fragmentation.

In one embodiment massively parallel databases rely on distribution of contiguous records at ingest in order to quickly search a large database. Fragmentation occurs over time. Conventionally, rebalancing cannot occur in an automated fashion, and intelligent, automated rebalancing cannot occur without knowledge of application-aware provisioning metrics.

In another embodiment using the technique, an application-aware technique configures and creates a massively parallel database. In such embodiment, the catalogue template used to configure the database is "remembered" and I/O profile patterns can be compared against the template and the configuration. Intelligent, application-aware storage software in such embodiment can detect when either fragmentation occurs or the application begins using the database in a way that is outside the bounds of the original service level agreement (hereinafter "SLA"). In such embodiment, the storage system at this point can proactively rebalance to adjust to either the change in I/O pattern or to a fragmented database.

Figure 1:
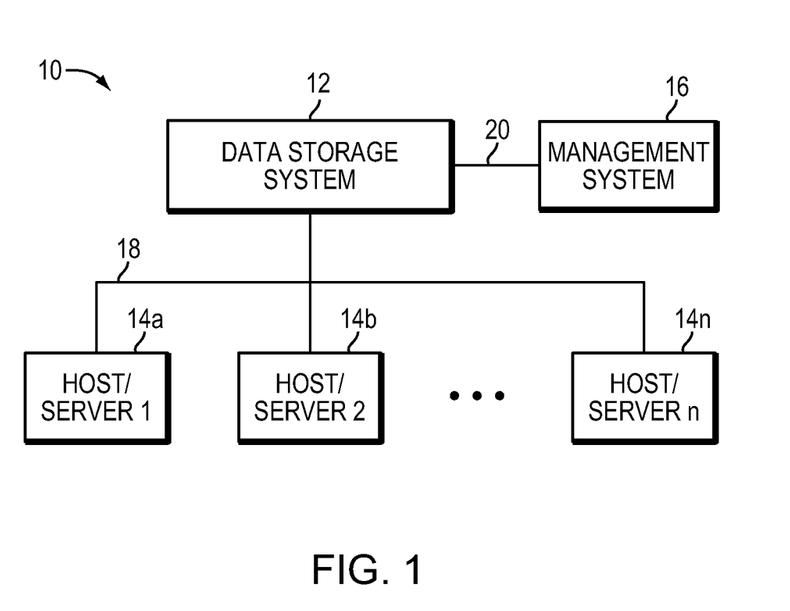
FIG. 1 is an example of an embodiment of a system that may utilize the techniques described herein.

Referring to FIG. 1, there is illustrated an example of an embodiment of a system that may be used in connection with performing one or more implementations of the current techniques described herein. The system 10 comprises a data storage system 12 connected to servers or n host systems 14a-14n through a communication medium 18. In this embodiment, the hosts 14a-14n may access the data storage system 12 by performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage system 12, and may also communicate with other components included in the system 10.

Additionally, the system 10 comprises a management system 16 connected to the data storage system 12 through a communication medium 20. The management system 16 may access the data storage system 12 in much the same way as the hosts 14a-14n by also performing input/output (I/O) operations or data requests. The communication medium 20 may also be a network connection, bus, and/or other type of data link, such as a hardwire or other connections known in the art.

In this embodiment, the communication medium 20 may be a LAN connection and the communication medium 18 may be an iSCSI or Fibre channel connection.

The n hosts 14a-14n, the management system 16 and the data storage system 12 may be connected to the communication mediums 18 and 20 by any one of a variety of connections as may be provided and supported in accordance with the type of each communication medium 18 and 20. The processors included in the hosts 14a-14n and the management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. It should also be noted that the n hosts 14a-14n, the management system 16 and the data storage system 12 may be located at the same physical site or alternatively located in different physical locations. A variety of different communication protocols may also be used in connection with communication mediums 18 and 20 such as SCSI, Fibre Channel, iSCSI, and the like. Some or all of the connections by which the hosts 14a-14n, management system 16 and the data storage system 12 may be connected to their respective communication medium may pass through other communication devices, such as a Connectrix or other switching equipment that may exist such as a phone line, a repeater, a multiplexer or even a satellite. In a further embodiment, the hosts 14a-14n may communicate with the data storage system over an iSCSI or a Fibre Channel connection and the management system may communicate with the data storage systems over a separate network connection using TCP/IP. It should also be noted that although the system 10 illustrates communications between the hosts 14a-14n and data storage system 12 being over a first connection, and communications between the management system and the data storage systems being over a second different connection, the communications may use the same connection. The particular type and number of connections may vary in accordance with particulars of each embodiment.

Each of the hosts 14a-14n may perform different types of data operations in accordance with different types of tasks. In this embodiment, each host 14a-14n may issue a data request to the data storage system 12 to perform a data operation. For example, an application executing on one of the hosts 14a-14n may perform a read or write operation resulting in one or more data requests to the data storage system 12.

The management system 16 may be used in connection with management of the data storage system 12. The management system 16 may include hardware and/or software components and may include one or more computer processors connected to one or more I/O devices. For example, the input and output devices may be a keyboard, mouse and display device and a data storage system manager may view information about current storage volume configuration on the display device of the management system 16 and/or provision data storage system resources.

The hosts 14a-14n provide data and access control information to the data storage system 12 through channels. Additionally, the storage system 12 may provide data to the hosts 14a-14n through the channels. The hosts 14a-14n may not address the disk drives of the storage system directly, but rather access to data may be provided to one or more hosts 14a-14n from what the hosts 14a-14n view as a plurality of logical devices or logical volumes (LVs). The LVs may or may not correspond to the actual disk drives. For example, one or more LVs may reside on a single physical disk drive. Data in a storage system may be accessed by multiple hosts allowing the hosts 14a-14n to share the data residing therein. An LV or LUN (logical unit number) may be used to refer to the foregoing logically defined devices or volumes.

The data storage system 12 may be an appliance with hardware and software for hosting the data storage of the one or more applications executing on the hosts 14a-14n. The appliance may include one or more storage processors and one or more devices upon which data is stored. The appliance may include software used in connection with storing the data of the hosts on the appliance and also software used in connection with configuring the data storage for use by the hosts. The tasks performed in connection with provisioning storage to store data for an application may include specifying the devices (logical and/or physical) used to store the data and configuring the data storage devices used such as specifying whether data replication is performed for disaster recovery. The data storage system 12 may also include other software for performing different data services. For example, the appliance may include backup server software which interacts with software on the hosts 14a-14n when performing a backup operation.

It will be readily apparent to those skilled in the art that the data storage system 12 illustrated in the figure may include one or more data storage devices. For example, the data storage system may be a data storage array offered by EMC Corporation of Hopkinton, Mass. The data storage system may include one or more data storage devices such as disks. Additionally, it will also be apparent that the data storage system may comprise more than one data storage system which may be inter-connected. The data storage systems may also be connected to the hosts 14a-14n through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the hosts 14a-14n to the data storage systems. It should be noted that each of the data storage systems may operate stand-alone, or may also be included as part of a storage area network (SAN) that includes, for example, other components such as other data storage systems. Each of the data storage systems may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Moreover, it will also be apparent that in the event of more than one data storage system that each of the data storage systems may include code thereon for performing the techniques as described herein.

It will also be apparent to those skilled in the art that the data storage system may be configured and provisioned for storage in response to a request from a user of the application executing on one of the hosts 14a-14n. Accordingly, the data storage system will be able to receive a request in relation to configuring and/or provisioning storage and provide different levels of automation and varying levels of exposure to details, options and the like associated with performing a requested application specific operation such as configuring and/or provisioning storage for the application executing on the host. The data storage may then be configured and provisioned in the terms of the application using it. In other words, this approach uses application-aware techniques to configure and provision data storage in the data storage system.

U.S. patent application Ser. No. 12/893,697 filed on 29 Sep. 2010 and assigned to EMC Corporation describes processes relating to configuring, provisioning and the like of data storage in a data storage system, and the disclosure therein is hereby incorporated herein by reference in its entirety.

Figure 2:
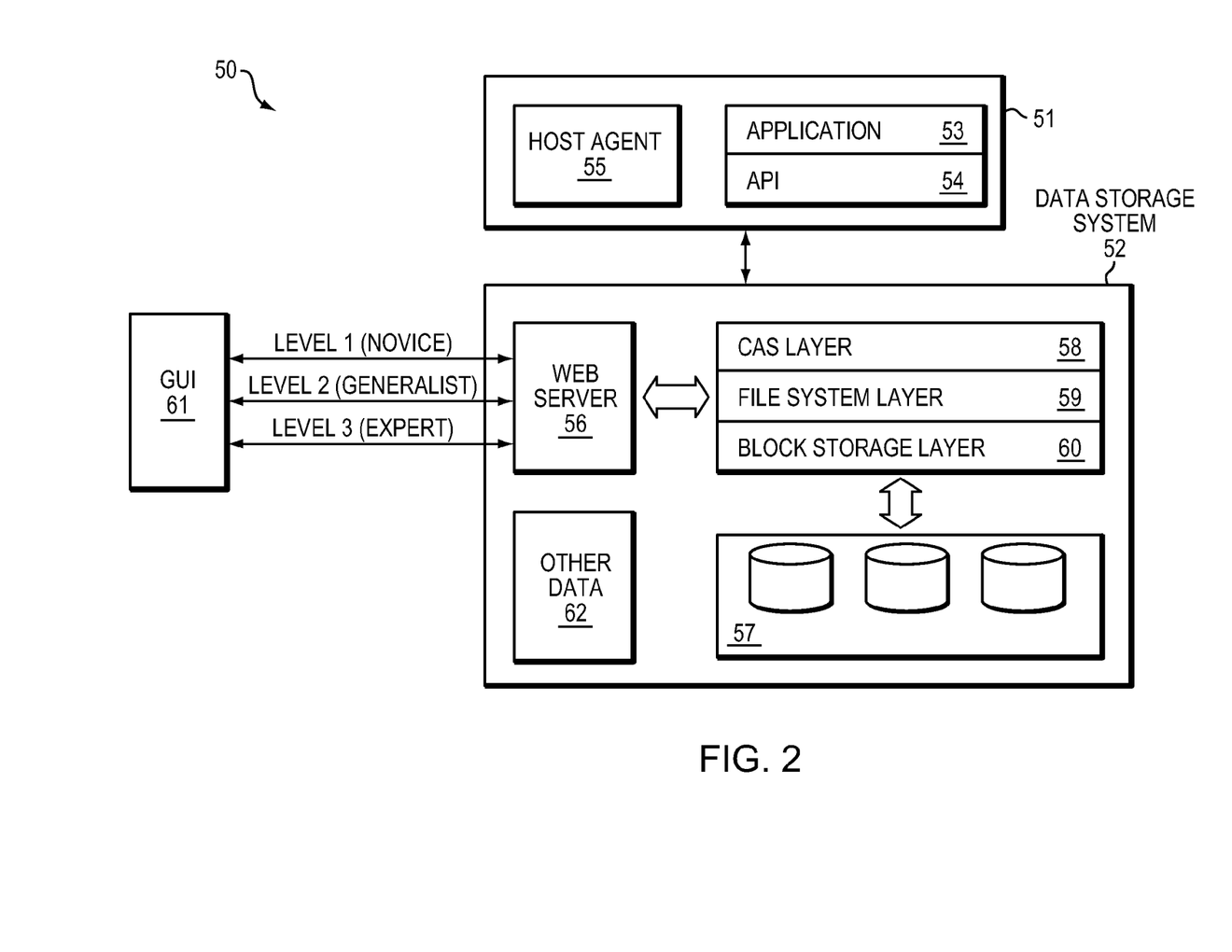
FIG. 2 is an example illustrating data flow and interaction between components of a system that may utilize the techniques described herein.

Referring to FIG. 2, there is illustrated an example system 50 comprising a host 51 communicating with a data storage system 52 that may be used in connection with performing one or more implementations of the current techniques described herein. It will be readily apparent to those skilled in the art that the host 51 is equivalent to any one of the n hosts 14a-14n as illustrated in FIG. 1. Additionally, the data storage system 52 is equivalent to the system 12 as illustrated in FIG. 1. Moreover, the functionality described with respect to these features in FIG. 1 also applies to the features in FIG. 2. Furthermore, if a feature is omitted from FIG. 2 it is not an exclusion of the feature. For example, the management system 16 has been omitted for ease of illustration. It will be readily apparent to those skilled in the art that this feature and any other omitted feature may be included in this example.

The host 51 may include one or more applications 53, an application programming interface 54 (hereinafter "API") and a host agent 55. The data storage system 52 may include a web server 56, storage devices 57 and software executing thereon comprising CAS layer 58, file system layer 59 and block storage layer 60. A graphical user interface 61 (hereinafter "GUI") may provide functionality so that a user may interact with the data storage system at any one of a plurality of levels when performing data storage management operations such as storage provisioning requests. In the example 50, 3 levels (Novice, Generalist and Expert) are illustrated. In accordance with different levels of expertise or knowledge, each of the 3 user interaction levels may provide the user with different levels of automation and varying levels of exposure to details in connection with performing an operation such as for a storage provisioning request.

The GUI 61 may communicate with the web server 56 of the data storage system in connection with a request such as to provision storage for a particular application such as the application 53 of host 51. In turn, the web server 56 may communicate with one or more other layers of software 58, 59 and 60 executing on the data storage system and with a host agent 55 in connection with performing the request such as to provision storage for application 53. The web server 56 and/or other software executing on the data storage system 52 may also access other data 62 such as application customization options, rules, and the like in connection with performing processing of provisioning and/or configuration of storage.

The application 53 executing on the host 51 may be, for example, a database application, an email application, a medical office application, a law office application, and the like. The application 53 may communicate with the data storage system 52 when issuing requests such as to perform I/O operations on application data stored as objects on the data storage system 53. In one embodiment as described below in more detail the data for an object may include the content and metadata describing the object such as in the form of object attributes (e.g., attribute name=value pairs). Examples of metadata may include a creation date or timestamp, object name specified as a character string, other string descriptors where a common string descriptor may be associated with and used to identify particular sets of objects (e.g., name of application or host associated with creating the object or last modifying the object, application version number, corporate division), and the like. The application 53 may communicate with the data storage system 53 using API 54. The API 54 may be, for example, code of a software development kit (SDK) for use when interfacing with CAS layer 58 to perform operations on the application data stored on devices 57. The host agent 55 may be software executing on the host 51. The host agent 55 may communicate with the GUI 61 in connection with configuring the host with authentication information used when the application 53 issues a request using API 54 to store data on the data storage system in accordance with an object-based storage system such as system 52 using CAS 58.

In connection with using CAS or another object-based storage system or layer, it should be noted that an embodiment may implement the CAS layer using one or more other software technologies than as illustrated in the example 50. The example 50 illustrates CAS 58 being implemented using file systems and block storage. However, CAS 58 may be implemented using other layers and associated technologies. For example, CAS 58 may be implemented on top of, or using, a database rather than a file system 59. The database may then use functionality represented by the block storage layer 60.

Figure 3:
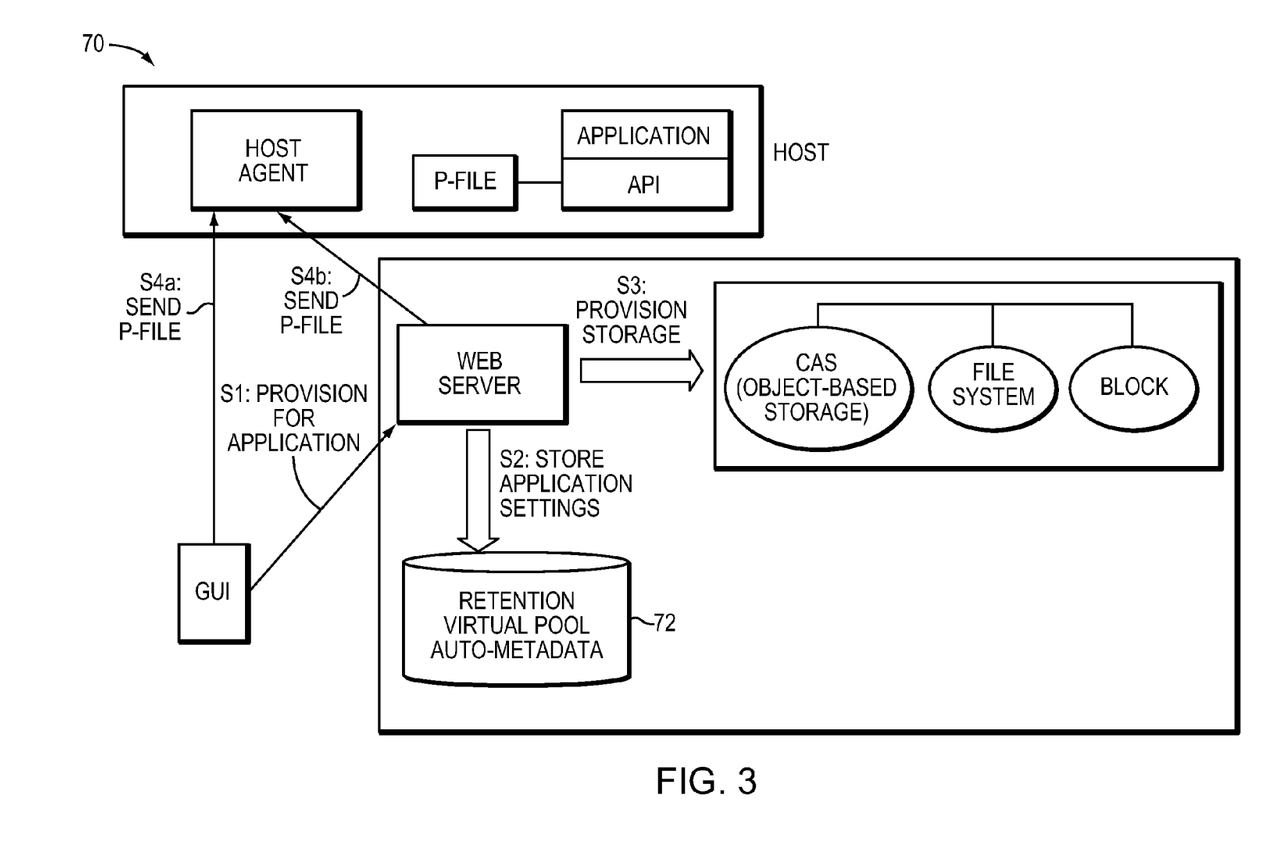
FIG. 3 an example illustrating data flow and interaction between components of a system that may utilize the techniques described herein.

Referring to FIG. 3, there is illustrated an example 70 of processing that may be performed in connection with a provisioning request. The example 70 provides additional detail and illustrates a flow of processing steps as described above that may be performed in connection with issuing a request to provision storage for use with an application executing on a host. FIG. 3 includes elements described above in connection with FIG. 2. As a first step S1, a user may issue the request to the data storage system using the GUI. In this example, the user may be interacting at a novice level where the user selects the application for which storage is being provisioned. The user also selects the host upon which the application will execute. In one embodiment, discovery processing may have been previously performed to obtain information regarding what hosts have connectivity to the GUI and data storage system and also what applications are executing on particular hosts. The user may be presented with a menu populated with appropriate portions of the foregoing discovery information so that a selection of a host and application executing thereon may be made. The host and application may be included in the provisioning request sent to the web server as indicated by S1. The web server may perform processing to provision the storage in accordance with defaults and best practices for the application. In this case, rules and rule processing may result in automatic specification of application settings which may be stored in a step S2 on the data storage system. Such settings as indicated by 72 may include a virtual pool name indicating the virtual pool to be created for the application provisioning request, a retention class defined and included as a metadata attribute for all objects created by the application and stored in the virtual pool, and metadata that is automatically generated and included for all objects created by the application and stored in the virtual pool. The settings of 72 may be used in connection with subsequent requests by the application to store objects in the virtual pool. Part of the automated processing may include creating the retention class definition as needed in addition to specifying that the retention class is to be included as an automatically generated portion of metadata for all objects stored in the named virtual pool.

In a step S3, the web server communicates with CAS and other software layers in order to provision the requested storage and create the virtual pool. As described herein in more detail, the data storage system includes code which embodies the template or process for provisioning storage for the application. Such processing may include configuring one or more block storage devices with appropriate device attributes, RAID level, and the like. One or more file systems may then be provisioned on the devices just configured. The foregoing one or more file systems may serve as the data store or container from which the CAS objects are created for use with the application.

The web server and/or GUI may then perform processing to automatically create the application profile or p-file and then also transmit the p-file to the host agent. The p-file may be transmitted to the host agent by the GUI (S4a), or alternatively by the web server (S4b) depending on which component(s) create the p-file. The host agent may store the p-file for subsequent use by the API when issuing requests to operate on objects of the named virtual pool.

An embodiment in connection with the processes may pre-configure block and/or file system level storage prior to receiving a provisioning request. For example, a data storage system may configure physical devices into RAID groups having a desired level of data protection prior to receiving any provisioning requests. Alternatively, the processing for configuring the block and/or file systems used for a provisioning request may be performed in response to receiving the request.

The data storage system may also perform other processing in connection with requests made by the application to store an object in the virtual pool. For example, the data storage system may expect that all objects stored in a named virtual pool by the application should have a particular file format. For the application, the data storage system may expect that the content for an object has a particular format such as in accordance with a defined standard. If the content is not in accordance with this format, the data storage system may refuse to store objects having content which is of an unexpected format. The expected file format may be indicated in the application settings 72. The CAS software layer of the data storage system may use information contained in metadata and/or object content in order to make a determination as to whether to accept/reject a write operation to write the object content. The file format of the object content may be determined by examining portions of the content to determine whether the portions contain an expected signature value. For example, one or more fields of the object content may be required by the standard to have one of a plurality of expected values. The fields may be checked to see if they contain valid values in accordance with the standard. Portions of the object metadata may also be examined. For example, a file format may be specified in object metadata communicated from the host. Thus, a determination as to whether to accept or reject object content for storage in a virtual pool may be based on interpretation of content in accordance with the expected signature and/or examination of object metadata.

As another example, the data storage system may accept or reject a request to store an object having content larger than a specified threshold size. The threshold size may also be specified and stored in the settings 72. The data storage system may determine the size of received object content and use the threshold size to determine whether to allow the object content to be stored in the virtual pool. Application settings and options, such as the required file format and threshold size, may be specified by a user as a customization (e.g., as an input provided with the provisioning request) or using best practice application-specific defaults as described above in connection with other settings.

Figure 4:
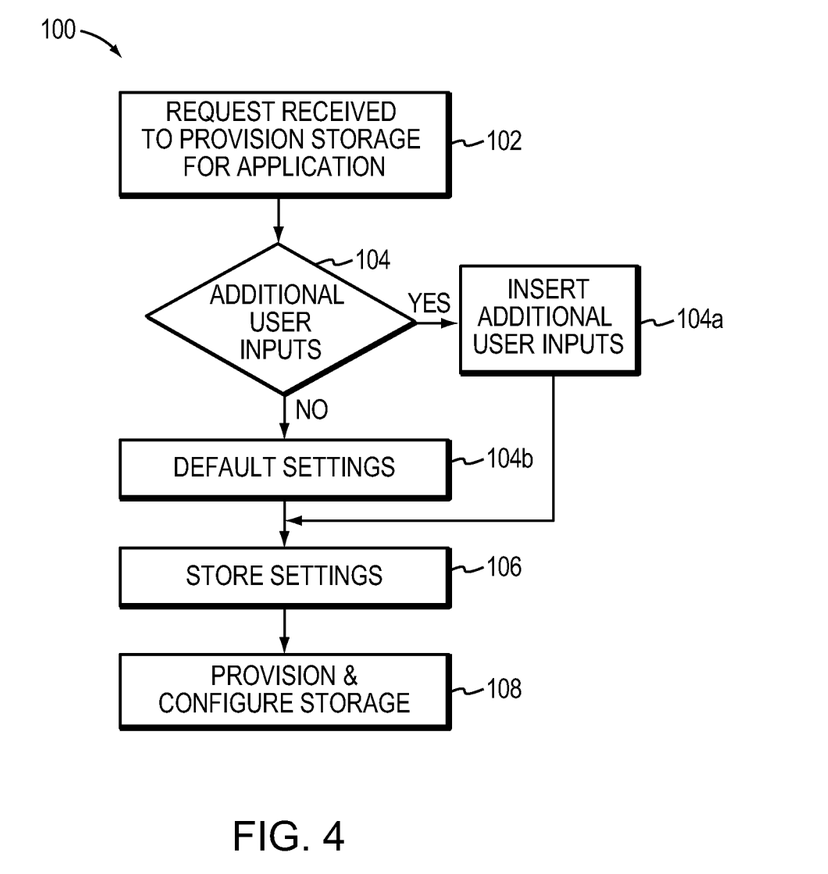
FIG. 4 is a flowchart of processing steps performed for provisioning and configuring storage for an application.

Referring to FIG. 4, the flowchart 100 illustrated summarizes the processing steps to be performed for provisioning data storage for an application. At step 102 a request is received by the data storage system from an interface to provision storage for a specified application. The interface may be a graphical user interface, command line interface or any other suitable type of user interface. The request may optionally 104 include one or more other inputs in accordance with the level of user interaction and any such information may also be transmitted to the data storage system. At step 106 the settings for the application may be stored on the data storage system. The settings may include customized settings that may be specified with the request based on additional user inputs 104a and/or default settings 104b that may be automatically provided by the data storage system in accordance with application specific best practices. At step 108 the storage device(s) may be configured and provisioned for data storage.

Figure 5:
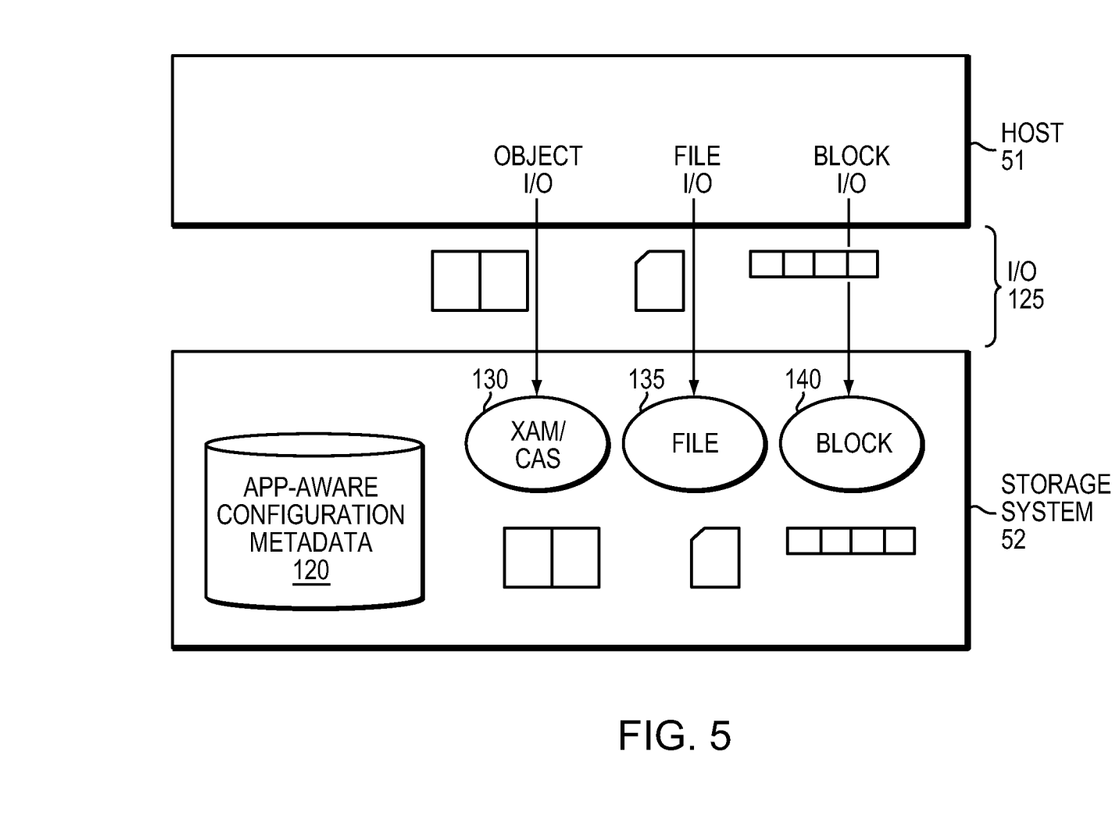
FIG. 5 is an example illustrating data and interaction between components of a system that may utilize the techniques described herein.
Figure 6:
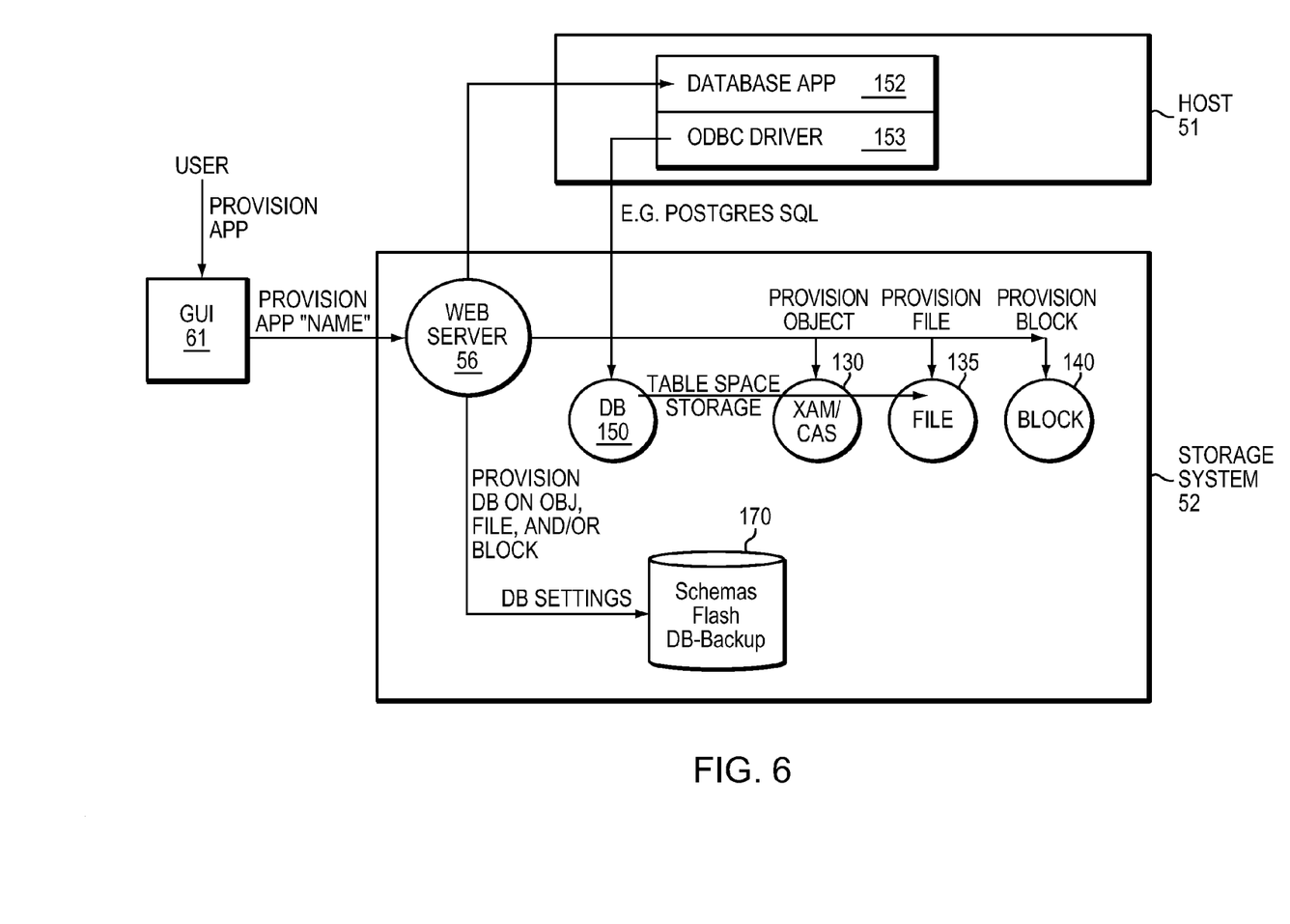
FIG. 6 is an example illustrating data and interaction between components of a system that may utilize the techniques described herein.

Referring to FIGS. 5 and 6, there is illustrated technology that may be used with the technique described herein for use in managing data storage for databases based on application awareness. The control paths, as described in relation to FIG. 3, includes steps S1, S2, S3 by which a user issues an application-based provisioning request to the data storage system using the GUI and settings 72 include application aware configuration metadata. In particular, in the case of object-based (XAM/CAS) storage for example, in response to the request, the data storage system creates LUNs, builds a file system on top of the LUNs, assigns the file system to XAM or CAS technology as the case may be, retrieves a set of parameters for the application, and sets up the data storage system in accordance with the parameters. For example, if the application is an e-commerce database application, the parameters may, inter alia, specify that the transaction data must be kept for several years and a virtual pool is needed that only allows the e-commerce application to access objects. By use of application aware logic, the system avoids requiring the user to implement the settings manually after selecting the application as the subject of the provisioning. As described above, a p-file is set up that, among other things, helps identify users who are permitted to access objects in the virtual pool.

With reference to FIG. 5, the data path may include I/O 125 being directed from host 51 to data storage system 52, and specifically to XAM/CAS (object) 130, file 135 and block storage 140 logic and interfaces depending on the type of I/O. In each case, whether the I/O is object, file, or block type, as the I/O flows into system 52 or is stored in system 52, metadata 120 is available that pertains to the application for which storage was provisioned in the control path. In particular, when the I/O arrives with its own content and metadata, this content and metadata can be mapped against metadata 120 that is based on application aware provisioning.

In at least one implementation, metadata 120 has requirements or guidelines as to characteristics of I/O that is acceptable or consistent with the application for which the provisioning was performed. Depending on the implementation, these characteristics may include or specify, for example, file formats, specific bit/byte sequences and the like.

Referring to FIG. 6, there is illustrated a database software feature 150 which may execute database algorithms in the system 52 so that the system 52 can have a database protocol interface to the host 51 as well as object (XAM/CAS), file, and block interfaces 130, 135, 140 respectively. The host 51 runs an e-commerce database application 152 and ODBC driver 153 and the software feature 150 can store the database (i.e. database tables) on system 52 through file interface 135 and/or block interface 140. In this embodiment a multi-node instance of software 150 is installed on system 52 and the other data storage systems (not illustrated) to allow communication with each other so as to present the database interface to the host 51. We have not illustrated other data storage system for ease of illustration however they would be similar to system 52. The user directs GUI 61 for provisioning system 52 and selects provisioning system 52 for an e-commerce database application. The GUI 61 sends a command to Web server 56 to provision system 52 for an e-commerce database application with a named database. In the example, the system 52 uses default settings that are already available to system 52 from storage 170 for the named database application. Such default settings may include a database schema, a setting to carve out a defined amount of data storage space, a setting to carve out storage on solid state disk drives (SSDs) for performance since certain LUNs will be heavily accessed, a setting to use a mirroring backup scheme since the database is mission critical and the like.

Figure 7:
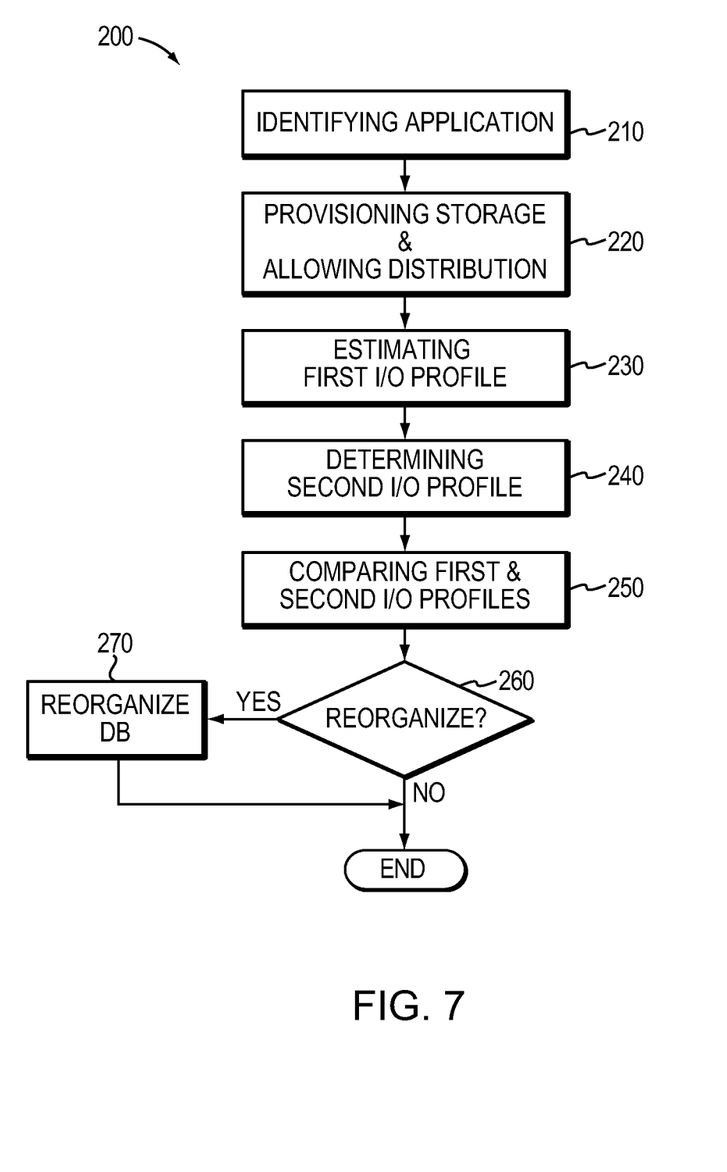
FIG. 7 is a flowchart summarizing the steps for managing a database in a data storage system.

Referring to FIG. 7, a flowchart 200 is illustrated summarizing the steps for managing databases in data storage systems. All the aforementioned systems and examples may be configured for performing the techniques summarized in the flowchart and described herein. In this embodiment the data storage system can comprise a plurality of nodes (not illustrated for ease of illustration) across which can be distributed the database tables. It will be apparent to those skilled in the art that the nodes may facilitate receiving, storing, accessing and processing data. The technique as described comprises identifying 210 an application intending to use a database. For example, the application may be the application 152 from FIG. 6 and the application may be identified when the user sends the request to configure and provision the data storage in the data storage system. It will be readily apparent to those skilled in the art that the application can be an e-commerce database application or any other database application such as a business application. On identifying the application the technique provisions 220 the data storage for storing the database. The technique subsequently allows the distribution 220 of database tables across the plurality of nodes. The distribution may be carried out in accordance with the user's instructions or in accordance with default instructions saved in one of the storage systems.

The technique may also require that the user enters details in respect of the application so that the technique can estimate 230 a first I/O profile. The requirement to enter these details may come before the distribution of the tables across the nodes. For example, the details may be entered when requesting configuration and/or provisioning of data storage. The first I/O profile is a forecasted I/O profile between the application and the database. Essentially, this is an estimated I/O profile by the user. For example, the user may estimate that a certain amount of transactions and queries will occur between the application and the database. The user may estimate that the profile will be write hot. He may estimate that the database will be busy at a certain time of the day. There is a variety of different I/O estimates that the user may make.

Additionally, the technique may be configured to capture information in connection with the activity between the application and the database when the database tables have been distributed across the nodes. The captured information may enable determination 240 of a second I/O profile. The second I/O profile is an actual in-running I/O profile between the application and the database. In one embodiment the profile may be determined periodically after an initial relax period as the application may not have a lot of activity initially. Subsequently, the technique compares 250 the first I/O profile and the second I/O profile to determine whether the profiles are similar. It may be expected that the first estimate profile should be similar to the in-running second profile. However, it is sometimes the case that the user has over estimated or under estimated the I/O profile. An overestimation may occur when the first expected I/O profile has been overstated. Conversely, an underestimation may occur when the first I/O profile has been understated. In both cases, it may be necessary to rebalance the data storage as one or more of the nodes may be extremely busy or extremely quiet and a redistribution would increase efficiency, performance and cost savings. If the technique decides 260 that there is a need for rebalancing, the reorganization 270 takes place. The decision to reorganize may ultimately be made in response to the comparison of the first and second profiles. If the decision decides 260 that there is no need for reorganizing, there is no change.

In one embodiment the reorganizing includes dumping the database tables across all the nodes to a log before redistributing the database tables to the nodes. Additionally, the reorganizing includes the addition or removal of a node in the data storage system. For example, the first and second I/O profiles may relate to the amount of transactions and queries between the application and the database. Additionally, the discrepancy may relate to the difference in the amount of transactions and queries between the forecasted first I/O profile and the actual second I/O profile. The reorganization may include the addition of at least one additional node in response to the comparison determining the second I/O profile is greater than the first I/O profile and subsequently to redistribute the tables across the nodes. Alternatively, the reorganizing may include the removal of at least one node in response to the comparison determining the expected first I/O profile is greater than the actual second I/O profile and subsequently the tables are re-distributed.

It will be appreciated by those skilled in the art that the first and second I/O profiles may provide detailed breakdowns of transactions and queries in connection with the respective nodes such that the comparison between the first and second I/O profiles can identify the quietest and busiest nodes allowing the reorganizing to migrate data from the busiest to the quietest node.

Figure 8:
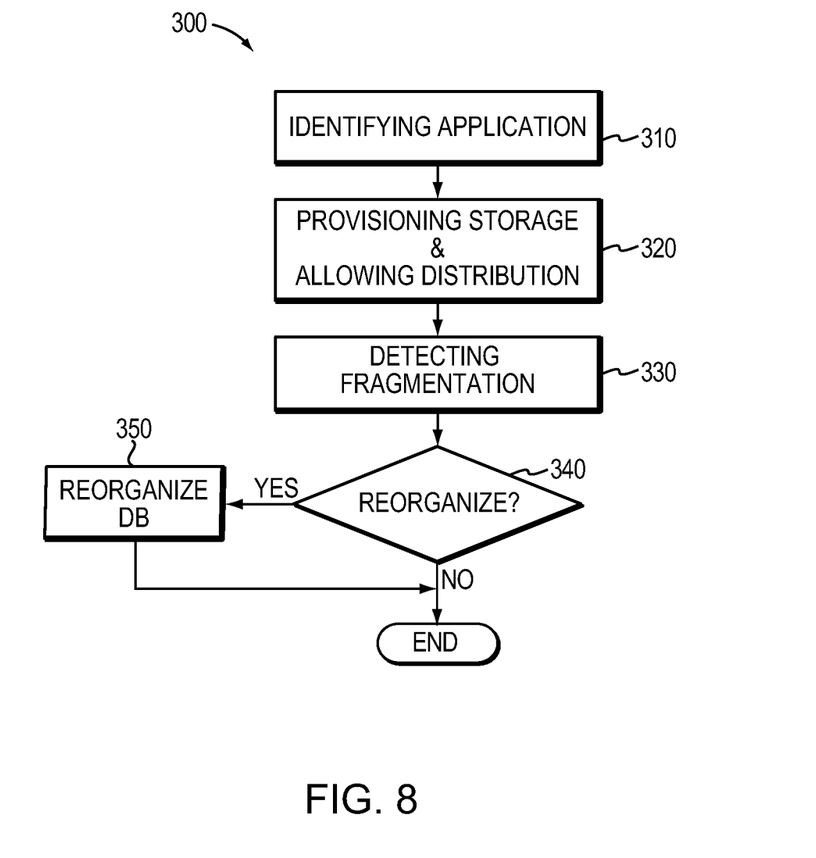
FIG. 8 is a flowchart summarizing the steps for managing a database in a data storage system.

Referring to FIG. 8, there is illustrated a flowchart 300 summarizing the steps for managing databases in data storage systems. All the aforementioned systems and examples may be configured for performing the techniques summarized in the flowchart and described herein. Indeed, all of the systems and examples may be configured to perform the techniques of FIGS. 7 and 8 or combinations thereof. The technique described herein is configured to identify 310 an application intending to use a database. The identification 310 may occur on the user submitting a request for provisioning of data storage in much the same way as described above. The technique may provision 320 the data storage system for data storage in response to the request and identifying the application. The database tables may subsequently be distributed 320 across the nodes. However, in this embodiment the technique is configured to detect 330 fragmentation in connection with the database tables on the respective nodes. In one embodiment the technique tracks record deletion per node so that when the number of deletions exceeds a threshold associated with the node, fragmentation is detected. For a given application, a certain amount of deletions may signal fragmentation. For example, if the database is an ecommerce database, a node may be deemed to be "out of balance" and fragmentation detected when it has seen twice the number of deletions than another node. If the database is an ERP database, then it may be five times the number of deletions. The threshold associated with the node may be set in response to identifying the application using the database. It will be appreciated from the foregoing that the technique described herein enables different types of application databases to have more performance tolerance when it comes to fragmentation. Alternatively, the technique may be configured to detect fragmentation automatically at defined time intervals. For example, the technique assumes that fragmentation occurs after a certain time period. Based on detecting fragmentation 340, the technique may reorganize 350 the database tables on the nodes. In this embodiment the reorganization involves dumping the tables to a text file, deleting the tables, recreating the tables and reloading the recreated tables to the nodes. If fragmentation is not detected, there is no change.

It will be appreciated that the management system 16 of FIG. 1 may assist both techniques described above in determining if the database needs to be reorganized.

An embodiment may implement the techniques herein using code executed by a computer processor. For example, an embodiment may implement the techniques herein using code which is executed by a processor of the data storage system. As will be appreciated by those skilled in the art, the code may be stored on the data storage system on any one of a computer-readable medium having any one of a variety of different forms including volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a data storage system processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. For a system comprising a plurality of nodes, a method for use in managing data-storage for a database application executing on a server coupled to the system based on application awareness, the method comprising:
   storing application settings corresponding to the database application;
   receiving an instruction to provision storage for the database application;
   in response to receiving the instruction, accessing the application settings to automatically provision storage for the database application that includes distributing database tables across the plurality of nodes;
   capturing I/O activity information in connection with the database application;

performing an operation to detect an imbalance in connection with the database tables, wherein the performed operation detects the imbalance by detecting for each node whether there exists a discrepancy between the captured I/O activity and a forecasted I/O activity used to distribute the database tables across the plurality of nodes, further wherein the performed operation detects the imbalance by detecting for each node whether fragmentation exists in connection with the database tables by comparing a number of deletions in connection with each of the nodes to a threshold;

determining to reorganize the database tables on the one or more nodes based on the performed operation; and in response to said determination, reorganizing the database tables, wherein the reorganizing includes dumping the database tables and redistributing the database tables to one or more nodes of the plurality of nodes.

2. The method as claimed in claim 1, wherein the reorganizing includes the addition of at least one additional node.

3. The method as claimed in claim 1, wherein the reorganizing includes the removal of at least one node.

4. The method as claimed in claim 1, wherein the operation detects the quietest and busiest nodes allowing the reorganizing to migrate database tables from the busiest to the quietest node.

5. The method as claimed in claim 1, wherein the threshold is dependent on the application.

6. A system for use in managing data-storage for a database application executing on a server coupled to the system based on application awareness, the system comprising:

a plurality of nodes;

a memory; and at least one hardware device, coupled to the memory, operative to:

store application settings corresponding to the database application;

receive an instruction to provision storage for the database application;

in response to receiving the instruction, access the application settings to automatically provision storage for the database application that includes distributing database tables across the plurality of nodes;

capture I/O activity information in connection with the database application;

perform an operation to detect an imbalance in connection with the database tables, wherein the performed operation detects the imbalance by detecting for each node whether there exists a discrepancy between the captured I/O activity and a forecasted I/O activity used to distribute the database tables across the plurality of nodes, further wherein the performed operation detects the imbalance by detecting for each node whether fragmentation exists in connection with the database tables by comparing a number of deletions in connection with each of the nodes to a threshold;

determine to reorganize the database tables on the one or more nodes based on the performed operation; and in response to said determination, reorganize the database tables, wherein the reorganizing includes dumping the database tables and redistributing the database tables to one or more nodes of the plurality of nodes.

7. The system as claimed in claim 6, wherein the reorganizing includes the addition of at least one additional node.

8. The system as claimed in claim 6, wherein the reorganizing includes the removal of at least one node.

9. The system as claimed in claim 6, wherein the operation detects the quietest and busiest nodes allowing the reorganizing to migrate database tables from the busiest to the quietest node.

10. The system as claimed in claim 6, wherein the threshold is dependent on the application.

* * * * *